United States Patent [19]

Hashiguchi et al.

[11] Patent Number: 4,503,165
[45] Date of Patent: Mar. 5, 1985

[54] CUPREOUS CATALYST AND PROCESS FOR MAKING SAME

[75] Inventors: Don H. Hashiguchi, University Heights; Ronald J. Dietrich, Strongsville, both of Ohio; George P. Schoepe, Raleigh, N.C.

[73] Assignee: SCM Corporation, New York, N.Y.

[21] Appl. No.: 597,853

[22] Filed: Apr. 9, 1984

[51] Int. Cl.$^3$ .................. B01J 21/04; B01J 23/06; B01J 23/72; B01J 23/74
[52] U.S. Cl. .................... 502/225; 502/226; 502/229; 502/231; 502/244; 502/318; 502/324; 502/331; 502/342; 502/343; 502/345; 502/346; 556/476
[58] Field of Search ............... 502/318, 324, 331, 343, 502/345, 231, 225, 226, 229, 244, 342; 556/476; 241/14

[56] References Cited

U.S. PATENT DOCUMENTS 2,443,902  6/1948  Ferguson et al. ............... 502/345 X
2,889,350  6/1959  Horny et al. ................... 502/346 X

*Primary Examiner*—W. J. Shine
*Attorney, Agent, or Firm*—R. A. Sturges; M. Douthitt

[57] ABSTRACT

Improved catalyst is made by including in a grind charge of cupreous particulates a small proportion of a hydroxide of Period IV metal having Atomic Number between 24 and 30, e.g. iron III oxide monohydrate. Said grind charge contains a major proportion of cuprous and cupric oxides, a minor proportion of elemental copper, and up to about 10% of promoter material. Such charge is subjected to high energy comminution with concomitant crystal lattice distortion. The catalyst is useful for the production of alkyl and aryl halosilanes.

10 Claims, No Drawings

CUPREOUS CATALYST AND PROCESS FOR MAKING SAME

This invention relates to an improvement on that of U.S. Ser. No. 548,604, filed Nov. 4, 1983, now abandoned, by Erhard Klar, Don H. Hashiguchi, and Ronald J. Dietrich and now abandoned, and the continuation-in-part application of said Ser. No. 548,604, namely Ser. No. 580,595, filed Feb. 16, 1984. These earlier applications related to particulate cupreous catalyst and a method for making same, more particularly to such catalyst for producing an alkyl or aryl halosilane (such as dimethyl dichlorosilane from methyl chloride and silicon) at elevated temperature. The teachings of that application are incorporated herein expressly by references.

BACKGROUND OF THE INVENTION

A variety of copper/copper oxide catalysts have been proposed for such silane production. They have been made from precipitated cupreous materials, from elemental copper variously produced, from alloys rich in copper, and from copper oxide-rich materials. The instant invention adds a special promoter effect to such silane catalyst which also has had crystal lattice distortion induced into it by high energy comminution.

BROAD STATEMENT OF THE INVENTION

One aspect of the instant invention is an improved process for producing a catalyst for cupreous particulates containing a major proportion of cuprous and cupric oxides and a minor proportion of elemental copper wherein a grind charge of particulates having average particle size above 15 microns and containing up to about 10% promoter-providing material is subject to high energy comminution with concomitant crystal lattice distortion until the average particle size of the resulting grind is no larger than 15 microns. Such improvement comprises including in said charge about 0.05–5% of an hydroxide of Period IV metal having Atomic Number between 24 and 30.

Another aspect of the instant invention is cupreous catalysts useful for alkyl or aryl chlorosilane production. One such catalyst is a high cuprous oxide catalyst consisting essentially of about 80–90% cuprous oxide, about 2–10% cupric oxide, about 2–10% elemental copper, and up to about 10% promoter including about 0.05–5% of such aforesaid hydroxide, said catalyst having surface area of about 1–8 square meters per gram, average particle size not substantially above about 15 microns, and exhibiting crystal lattice distortion. Another such catalyst has a medium content of cuprous oxide; it consists essentially of about 30–75% cuprous oxide, about 10–45% cupric oxide, about 4–25% elemental copper, and up to about 10% promoter including about 0.05–5% of such aforesaid hydroxide, said catalyst having surface area of about 1–8 square meters per gram, average particle size not substantially above about 15 microns, and exhibiting crystal lattice distortion.

DETAILED DESCRIPTION OF THE INVENTION

For efficiency and economy the cupreous particulates providing the grind charge (i.e. the charge to the high energy milling operation) generally are no larger than about 80 mesh, advantageously −150 mesh, and preferably preponderantly −325 mesh (so such charge will not unduly restrict production in the high energy milling operation). Average particle size of such grind charge is above 15 microns and ordinarily 90% or more of it will be at least about 25 microns or coarser. Desirably these particulates should not contain more than about a percent of adventitious (that is, normally or inherently present, but not deliberately added) material for best control of charge analysis. The grind charge desirably is extremely low in lead and other impurities that are considered detrimental for silane catalysts.

The grind charge can contain, if desired, up to about 10% and usually just a few percent of promoter-providing material such as elemental aluminum, zinc, iron, or the oxides or chlorides of these metals, copper chloride, even a little antimony (below 0.05%), and silica or aluminosilicates typically up to a few percent maximum. The promoter can be an original part of the grind charge of cupreous particulates, or it can be added thereto prior to the high energy comminution that follows. In some instances it can be efficient to add a promoter-providing material such as iron and/or other metal as particles of an alloy of such metal with at least part of the particulate copper that is to be further processed by pyrometallurgy (e.g. oxidation) to make such grind charge for the high energy milling.

The particular new type of promoter that is a useful additive to a grind charge of cupreous particulates just prior to its higher energy comminution is a small dosage of an hydroxide of Period IV metal having Atomic Number between 24 and 30. This Period refers to the periodic arrangement of the elements as tabulated at page 444–445 of the *Handbook of Chemistry and Physics*, 40th Edition, published by Chemical Rubber Publishing Company, Cleveland, Ohio. Typically, such additive can be as low as about 0.05%, and it can reach about 5% by weight of such grind charge. Whether such material helps the catalyst by keeping particles thereof free flowing in use, and/or whether it acts to form the sites which are beneficially attacked by a reactant such as a chloride in the halosilane manufacture, and/or whether it makes for minute irregular areas that are susceptible to beneficial attack, or whether the enhancement of the catalyst is due to another reason is not known at present.

A preferred such additive is a hydrated iron oxide, most preferably iron III oxide hydrate, for efficiency and economy. While the temperature in the high energy comminution in some instances can rise to as high as, say, 150°, only minor dehydration of most of such additives is to be expected, and in most instances what of the additive remains in the final catalyst is expected to be hydrated to some degree even though it is possibly not as fully hydrated as the hydrated oxide charged to the high energy comminution operation.

Generally the instant hydroxides are obtainable in the form of powders and a mixture of them can be used. While use of solutions or dispersions of them are conceivable, such practice can make preparation more complex, thus not favored. Sometimes they are referred to as "hydrous oxides" or "hydrated oxides". Basic (hydroxylated) salts such as basic copper carbonate, chloride, or nitrate are useful hydroxides here. Some of these hydroxides can be stabilized with salts (e.g. copper II hydroxide with sodium sulfate and trisodium phosphate). The metal moiety of these hydroxy additives includes chromium, magnanese, iron, cobalt, nickel, copper, and zinc in appropriate valence to provide nominally the hydroxide for dosing the grind charge. The additives should not be confused with an anhydrous or practically anhydrous oxide such as $Fe_2O_3$. Advantageously the dosage of the hydroxide in the grind charge for high energy comminution is between about 0.2 and 1% of such charge for efficiency and economy; less than about 0.05% can be too little to expect appreciable beneficial effect; more than about 5% does not appear to be needed and can act as a diluent, but it is conceivable to tolerate even more if desired.

Advantageously the cupreous material for making the grind charge is directly from pyrometallurgical processing, i.e., it is pyrometallurgically-sourced for efficiency and control of product quality. By this is meant that the ultimate chemical step in making such cupreous material prior to using it as a grind charge here is, for example, effected by the heating of copper metal and/or a copper compound such as a copper oxide or carbonate in an inert and/or a chemically reactive atmosphere (usually a reducing or an oxidizing one) or in the substantial absence of any atmosphere. One typical source of such cupreous material is the mill scale that forms on the surfaces of hot copper ingots that are exposed to air; another is from the air-oxidized surfaces of hot copper machining chips and cuttings; another is the controlled air oxidation of copper particles; still another is from the collection of vaporized copper and/or a dust of an oxide of copper. The cupreous material for making a grind charge can be from a single source as, for example, tha air oxidation of fine copper particles, or it can be a blend of products from a plurality of sources. Even cupreous material that has been generated initially by a hydrometallurgical process (such as by precipitation from an aqueous solution) can be considered as being from a pyrometallurgical source for the instant purposes if such material is further processed with heating, for example to reduce or to oxidize it with a gas for conditioning for the high energy milling.

The grind charge advantageously has been comminuted previously to fairly small size in a mill with a short retention time such as a hammermill using swing or fixed hammers. Other conventional pulverizing apparatus also can be used for such operation preparatory to the high energy milling. Thus, one can use a roller mill, an attrition mill, or a fluid energy mill.

Especially advantageous for the instant process is the careful selection of a grind charge of analysis as outlined herein coupled with the fineness of grind made by the high energy comminution of such charge (to give adequate surface area and crystal lattice distortion to the catalyst product). Desirably such comminution is operated continuously, that is, with continuous feed to and take-off from the high energy milling (comminuting) apparatus. Batch milling can be used for this step if desired, however. Illustrative of a useful batch mill is the Sweco (the trademark of Sweco, Inc.) vibratory mill. A continuous high energy comminution apparatus preferred is a so-called "Palla mill", the product of Humboldt-Wedag of West Germany. A smaller laboratory size batch vibratory mill that can be useful is the Megapac (a trademark of Pilamec Ltd.) mill. Such mills generally are called "vibratory ball mills"—although the grinding media inside the shell(s) is often other than spherical in shape. Such media typically is made of a hard ceramic (such as alumina, zirconia), a steel (such as a stainless steel, a low alloy steel, a nickel steel), tungsten carbide, etc., all conventional grinding media. Such mill generally oscillates with a compound motion that is imparted to the shell(s) by an eccentric mechanism.

Another high energy mill useful for the instant purpose is the "Szegvari mill" made by the Union Process Company. It is basically a stirred ball mill, and it even can be modified in accordance with the precepts of U.S. Pat. No. 3,927,837. In summary, the high energy comminution in the instant process is done by an apparatus that has solid grinding media in it, is driven with substantially more horsepower per unit weight of grinding medium than is a conventional tumbling ball mill, and provides a prolonged residence time (actually an average residence time in a continuous operation) for the grind charge typically of at least about 10 minutes to an hour or even longer if necessary or desired.

In a matter of a half hour to an hour a large high energy mill can comminute the grind charge to size much smaller than 10 microns average size, usually 2–7 microns. If additional size reduction is needed, the output can be recycled for remilling.

In a preferred processing operation for making the catalyst the grind charge has particle size no coarser than 150 mesh, and the particulates thereof contain about 75–95% cuprous oxide, about 4–10% cupric oxide, and about 4–10% elemental copper.

In another useful processing operation for making the catalyst the grind charge has at least about 95% of its particles not substantially larger than 325 mesh and the particulates charged contain about 30–75% cuprous oxide, about 10–45% cupric oxide, and about 4–25% elemental copper. To obtain the particular stoichiometry of such charge it is often necessary to blend two or more powders of differing oxide and elemental copper contents.

The following example shows the process embodiment and the catalyst embodiment now preferred for efficiency and economy, but should not be construed as limiting the invention. In this specification all parts are parts by weight, all percentages are weight percentages, all temperatures are in degrees Celsius, and all mesh sizes are U.S. Standard Sieve sizes unless otherwise expressly noted; additionally, in this specification an average particle size means the mass median particle size as measured with the Microtrac (a trademark of Leeds & Northrup Company) particle size analyzer, and Specific Surface Area (SSA) is measured by the BET (Brunauer, Emmett, and Teller) method.

EXAMPLE 1

A blend of air-oxidized copper particles is hammer-milled to make a grind charge for catalyst production. Before oxidation such alloy particles contain less than about 0.1% other material. Particle size of the hammer-milled grind charge is all −150 mesh, with about 90% being −325 mesh. Its approximate analysis is:

| Ingredient | Wt. % | |
|---|---|---|
| $Cu_2O$ | 49.7 | |
| CuO | 33.7 | |
| Cu° | 16.5 | |
| Fe | 0.01 | |
| Sn | 0.04 | |
| Pb | 0.03 | |
| SSA, $m^2$/gm. | 0.48 | (Specific surface area) |

To said grind charge there is added pure yellow iron oxide pigment, Grade YLO-1888, a product of Pfizer, Inc. This material is iron III oxide monohydrate, a fine yellow powder containing 85% $Fe_2O_3$, having 12% weight loss on ignition, and containing 0.1% soluble salts. Enough is added to provide ½% equivalent iron metal in the catalyst overall.

The thus-dosed grind charge is fed continuously in several passes through a Model 35U Palla mill (using steel shot as the grinding medium) and withdrawn continuously therefrom. The net product output is about 68 kilos per hour, and the average overall high energy grinding time is about ½ hour. Such output is useful as a catalyst for the reaction of methyl chloride with silicon to produce dimethyldichlorosilane. The catalyst, exhibiting crystal lattice distortion, is of the following analysis:

| Ingredient | Wt. % | |
|---|---|---|
| $Cu_2O$ | 56.4 | |
| CuO | 35.5 | |
| Cu° | 9.1 | |
| Fe | .0.5 | |
| Sn | 0.03 | |
| Pb | 0.04 | |
| SSA, $m^2$/gm. | 3.0 | (Specific surface area) |
| Particle size, microns | 3.4 | (mass median diameter) |

EXAMPLE 2

Catalyst exhibiting crystal lattice distortion and being particularly suitable for the reaction of methyl chloride with silicon to produce dimethyldichlorosilane is made like that of Example 1 except that, in place of the iron III oxide monohydrate, 0.5 part of finely-divided copper II carbonate dihydroxide—$Cu_2(OH)_2CO_3$—is used per 100 parts of the undosed cupreous grind charge.

EXAMPLE 3

Catalyst essentially like that of Example 2 is made like that of Example 2 except that 0.5 part of zinc hydroxide—$Zn(OH)_2$—is used instead of the copper II carbonate dihydroxide.

EXAMPLE 4

Catalyst essentially like that of Example 2 is made like that of Example 2 except that 2 parts of basic chromium III chloride hexahydrate—$CrCl_3.6H_2O$—are used instead of the copper II carbonate dihydroxide.

EXAMPLE 5

Catalyst essentially like that of Example 2 is made like that of Example 2 except that 0.5 part of cobalt II hydroxide—$Co(OH)_2$—is used instead of the copper II carbonate dihydroxide.

EXAMPLE 6

Catalyst essentially like that of Example 2 is made like that of Example 2 except that 0.5 part of manganese II chloride tetrahydrate—$MnCl_2.4H_2O$—is used instead of the copper II carbonate dihydroxide.

EXAMPLE 7

Catalyst essentially like that of Example 2 is made like that of Example 2 except that 0.5 part of nickel II hydroxide—$Ni(OH)_2$—is used instead of the copper II carbonate dihydroxide.

What is claimed is:

1. In a process for making catalyst from cupreous particulates containing a major proportion of cuprous and cupric oxides and a minor proportion of elemental copper wherein a grind charge of said particulates having average particle size about 15 microns and containing up to about 10% of promoter-providing material selected from the elements aluminum, zinc and iron, the oxides of aluminum, zinc and iron, the chlorides of aluminum, zinc, copper and iron, silica, aluminosilicates, and or below 0.05% antimony promoter is subjected to high energy comminution until the average particle size of the resulting grind is no larger than 15 microns, the improvement which comprises including in said charge about 0.05-5% of an hydroxide of Period IV metal having Atomic Number between 24 and 30.

2. The process of claim 1 wherein said cupreous particulates contain about 75-95% cuprous oxide, about 2-10% cupric oxide, about 2-10% elemental copper, said hydroxide is hydrated iron oxide, and said grind charge has particle size no coarser than about 80 mesh.

3. The process of claim 1 wherein said cupreous particulates contain about 30-75% cuprous oxide, about 10-45% cupric oxide, about 4-25% elemental copper, said hydroxide is a hydrated iron oxide, and said grind charge has at least about 95% of its particles not substantially larger than about 325 mesh.

4. The process of claim 1 wherein at least the major proportion of said cupreous particulates for making said grind charge is pyrometallurgically-sourced, and said hydroxide is hydrated iron oxide.

5. Particulate high cuprous oxide catalyst for alkyl or aryl halosilane production, said catalyst consisting essentially of about 80-90% cuprous oxide, about 2-10% cupric oxide, about 2-10% elemental copper, and up to about 10% promoter selected from the elements aluminum, zinc and iron, the oxides of aluminum, zinc and iron, the chlorides of aluminum, zinc, copper and iron, silica, aluminosilicates, and or below 0.05% antimony promoter including about 0.05-5% of an hydroxide of Period IV metal having Atomic Number between 24 and 30, said catalyst having surface area of about 1-8 square meters per gram, average particle size no larger than 15 microns, and exhibiting crystal lattice distortion.

6. The catalyst of claim 5 wherein said hydroxide is a hydrated iron oxide.

7. The catalyst of claim 6 wherein said hydrated iron oxide is iron III oxide monohydrate.

8. Particulate medium content cuprous oxide catalyst for alkyl or aryl halosilane production, said catalyst consisting essentially of about 30-75% cuprous oxide, about 10-45% cupric oxide, about 4-25% elemental copper, and up to about 10% promoter selected from the elements aluminum, zinc and iron, the oxides of aluminum, zinc and iron, the chlorides of aluminum, zinc, copper and iron, silica, aluminosilicates, and or below 0.05% antimony promoter including about 0.05-5% of an hydroxide of Period IV metal having Atomic Number between 24 and 30, said catalyst having specific surface area of about 1-8 square meters per gram, average particle size no larger than 15 microns, and exhibiting crystal lattice distortion.

9. The catalyst of claim 7 wherein said hydroxide is hydrated iron oxide.

10. The catalyst of claim 9 wherein said hydrated iron oxide is iron III oxide monohydrate.

* * * * *